United States Patent
Franzo

(10) Patent No.: US 11,748,522 B2
(45) Date of Patent: Sep. 5, 2023

(54) SYSTEMS, DEVICES, AND METHODS FOR PREVENTION OF RECORDING CONTENT

(71) Applicant: Peanut Butter and Jelly TV L.L.C., Covington, LA (US)

(72) Inventor: Robert Franzo, Covington, LA (US)

(73) Assignee: PEANUT BUTTER AND JELLY TV L.L.C., Covington, LA (US)

( * ) Notice: Subject to any disclaimer, the term of this patent is extended or adjusted under 35 U.S.C. 154(b) by 306 days.

(21) Appl. No.: 16/925,240

(22) Filed: Jul. 9, 2020

(65) Prior Publication Data

US 2021/0012036 A1 Jan. 14, 2021

Related U.S. Application Data

(60) Provisional application No. 62/887,513, filed on Aug. 15, 2019, provisional application No. 62/873,573, filed on Jul. 12, 2019.

(51) Int. Cl.
| | |
|---|---|
| *G06F 21/00* | (2013.01) |
| *G06F 21/84* | (2013.01) |
| *G06F 21/62* | (2013.01) |
| *H04L 9/40* | (2022.01) |
| *G06F 21/31* | (2013.01) |

(52) U.S. Cl.
CPC .......... *G06F 21/84* (2013.01); *G06F 21/6218* (2013.01); *H04L 63/102* (2013.01); *G06F 21/31* (2013.01)

(58) Field of Classification Search
CPC ...... G06F 21/84; G06F 21/6218; G06F 21/31; H04L 63/102
See application file for complete search history.

(56) References Cited

U.S. PATENT DOCUMENTS

| | | | |
|---|---|---|---|
| 9,769,730 B1* | 9/2017 | Hua | H04L 41/5009 |
| 10,250,614 B2* | 4/2019 | Fieldman | G09B 5/02 |
| 10,824,769 B2* | 11/2020 | Liu | G06F 21/6245 |
| 2013/0110565 A1* | 5/2013 | Means, Jr | G06Q 10/063 705/7.11 |
| 2014/0155022 A1* | 6/2014 | Kandregula | G06Q 50/01 455/405 |
| 2014/0320511 A1* | 10/2014 | Xu | G09G 5/363 345/531 |
| 2015/0003595 A1* | 1/2015 | Yaghi | H04M 3/5175 379/85 |
| 2015/0160813 A1* | 6/2015 | Filatov | H04L 63/145 715/741 |
| 2017/0068829 A1* | 3/2017 | Shaw | G06F 21/50 |

(Continued)

OTHER PUBLICATIONS

Fratantonio et al., "Cloak and Dagger: From Two Permissions to Complete Control of the UI Feedback Loop", 2017 IEEE Symposium on Security and Privacy (SP), Date of Conference: May 22-26, 2017.*

*Primary Examiner* — Morshed Mehedi
(74) *Attorney, Agent, or Firm* — Sheridan Ross P.C.

(57) ABSTRACT

A non-transitory computer readable medium includes instructions that when executed by a processor, cause the processor to detect an attempt to record content being displayed on a display, cause, in response to detecting the attempt, an obstruction to be displayed on the display to block viewing of the content on the display, and remove the obstruction on the display to allow viewing of the content on the display when one or more conditions are met.

20 Claims, 6 Drawing Sheets

(56) References Cited

U.S. PATENT DOCUMENTS

| | | | |
|---|---|---|---|
| 2017/0323099 A1* | 11/2017 | Song | G06F 21/554 |
| 2018/0336373 A1* | 11/2018 | Deenadayal | G06F 21/10 |
| 2019/0149534 A1* | 5/2019 | Wyn-Harris | H04L 63/08 |
| | | | 726/4 |
| 2019/0171794 A1* | 6/2019 | Dhruva | G06F 21/6245 |
| 2021/0012036 A1* | 1/2021 | Franzo | G06F 21/6218 |

* cited by examiner

SYSTEMS, DEVICES, AND METHODS FOR PREVENTION OF RECORDING CONTENT

CROSS REFERENCE TO RELATED APPLICATIONS

This application claims the benefit of and priority to U.S. Provisional Application Ser. No. 62/873,573 filed on Jul. 12, 2019, and U.S. Provisional Application Ser. No. 62/887,513, filed on Aug. 15, 2019, the entire contents of each of which are hereby incorporated by reference.

FIELD

Inventive concepts relate to systems, devices, and methods for prevention of recording content.

SUMMARY

At least one example embodiment is directed to a non-transitory computer readable medium including instructions that when executed by a processor, cause the processor to detect an attempt to record content being displayed on a display, cause, in response to detecting the attempt, an obstruction to be displayed on the display to block viewing of the content on the display, and remove the obstruction on the display to allow viewing of the content on the display when one or more conditions are met.

At least one example embodiment is directed to a device including a display that displays content, a memory including instructions, and a processor that executes the instructions to detect an attempt to record the content being displayed on the display, cause, in response to detecting the attempt, an obstruction to be displayed on the display to block viewing of the content on the display, and remove the obstruction on the display to allow viewing of the content on the display when one or more conditions are met.

At least one example embodiment is directed to a method that includes displaying content on a display, detecting an attempt to record the content being displayed on the display, causing, in response to detecting the attempt, an obstruction to be displayed on the display to block viewing of the content on the display, and removing the obstruction on the display to allow viewing of the content on the display when one or more conditions are met.

At least one example embodiment is directed to a system including a mobile device including an application stored thereon for providing content on a display of the mobile device, an application server in communication with the application through the mobile device, and a content source that provides the content to the application. The mobile device is configured to detect an attempt to record the content being displayed on the display, cause, in response to detecting the attempt, an obstruction to be displayed on the display to block viewing of the content on the display, and remove the obstruction on the display to allow viewing of the content on the display when one or more conditions are met.

DETAILED DESCRIPTION

Figure 1:
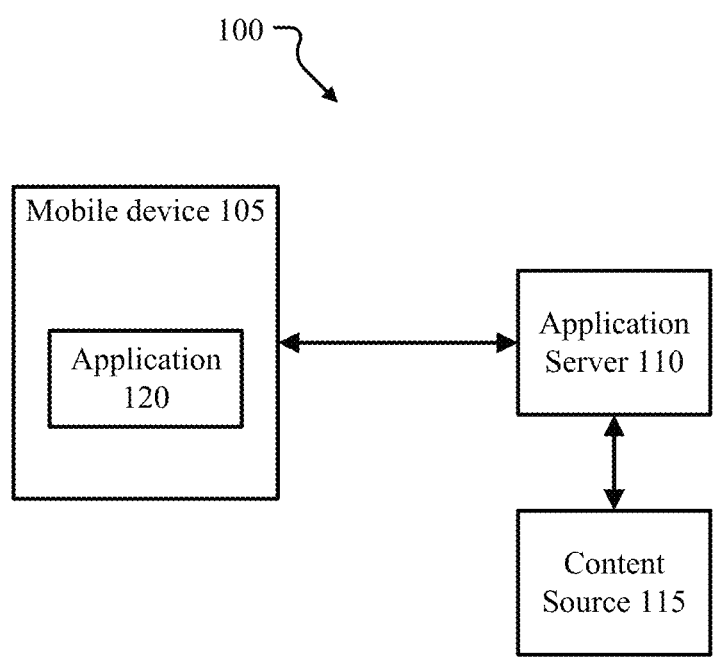
FIG. 1 illustrates a system in accordance with at least one example embodiment.

FIG. 1 illustrates a system 100 that includes a mobile device 105, an application server 110, and a content source 115. The mobile device 105 may be, for example, a smartphone. However, example embodiments are not limited thereto, and the mobile device 105 may include other computing devices such as laptops, desktops, tablets, and the like. The mobile device 105 need not be mobile, and may be normally stationary. The mobile device 105 may have processing, storage, and viewing capabilities. For example, the mobile device 105 may store an application (or app) 120 that enables consumption of content (e.g., audio and/or video content) from the content source 115. The content may be, for example, a live or prerecorded audio/video stream and/or still images.

The application server 110 may have processing and storage capabilities to manage various aspects of the application 120 and the content source 115.

The content source 115 may generate live audio/video content and/or still images for viewing on the application 120 at the mobile device 105. The content source 115 may be in communication with the mobile device 105 through the application server 110.

The mobile device 105, the application server 110, and the content source 115 may include one or more interfaces for enabling wired and/or wireless communication over a communication network. An example of the communication network is the Internet, an LTE network, and the like. As such, the one or more interfaces may include any interface for enabling communication according to known protocols (e.g., TCP/IP protocols).

Although not explicitly shown, it should be understood that the application server 110 may manage more mobile devices 105 and/or content sources 115, as desired. The system 100 may be useful for a care environment where a user of the mobile device 105 desires to monitor aspects of the care environment. Examples of the care environment include facilities dedicated to child day care, hospice care, pet care, etc.

Although not explicitly shown, each of the mobile device 105, the application server 110, and the content source 115 may include a memory storing instructions and a processor that executes the instructions to enable functionality of the system 100. The memory may be a computer readable medium including the instructions that are executable by the processor. The memory may include any type of computer memory device, and may be volatile or non-volatile in nature. In some embodiments, the memory may include a plurality of different memory devices. Non-limiting examples of memory include Random Access Memory (RAM), Read Only Memory (ROM), flash memory, Electronically-Erasable Programmable ROM (EEPROM), Dynamic RAM (DRAM), etc. The memory may include instructions that enable the processor to control the various elements of the system 100 and to store data. The memory may be local (e.g., integrated with) the processor and/or separate from the processor.

The processor may correspond to one or many computer processing devices. For instance, the processor may be provided as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor may be provided as a microprocessor, Central Processing Unit (CPU), or plurality of microprocessors that are configured to execute the instructions sets stored in memory. The processor enables various functions of the system 100 upon executing the instructions stored in memory.

In at least one example embodiment, the application server 110 or other source stores instructions (i.e., the application 120) that cause the mobile phone 105 to perform various operations described herein. The mobile phone 105 then downloads the instructions (or application) from the application server 110 or other source, which enables the mobile phone 105 to carry out various operations described herein by executing the downloaded instructions (e.g., instructions for detecting a recording, instructions for displaying an obstruction, and instructions for removing the obstruction). Additionally or alternatively, some operations may be performed by executing instructions at the application server 110 that is in constant communication with the mobile device 105 while other operations may be performed by executing instructions at the mobile device 105. Alternatively, all operations are performed by executing instructions at the application server 110 in constant communication with the mobile device 105.

Figure 2:
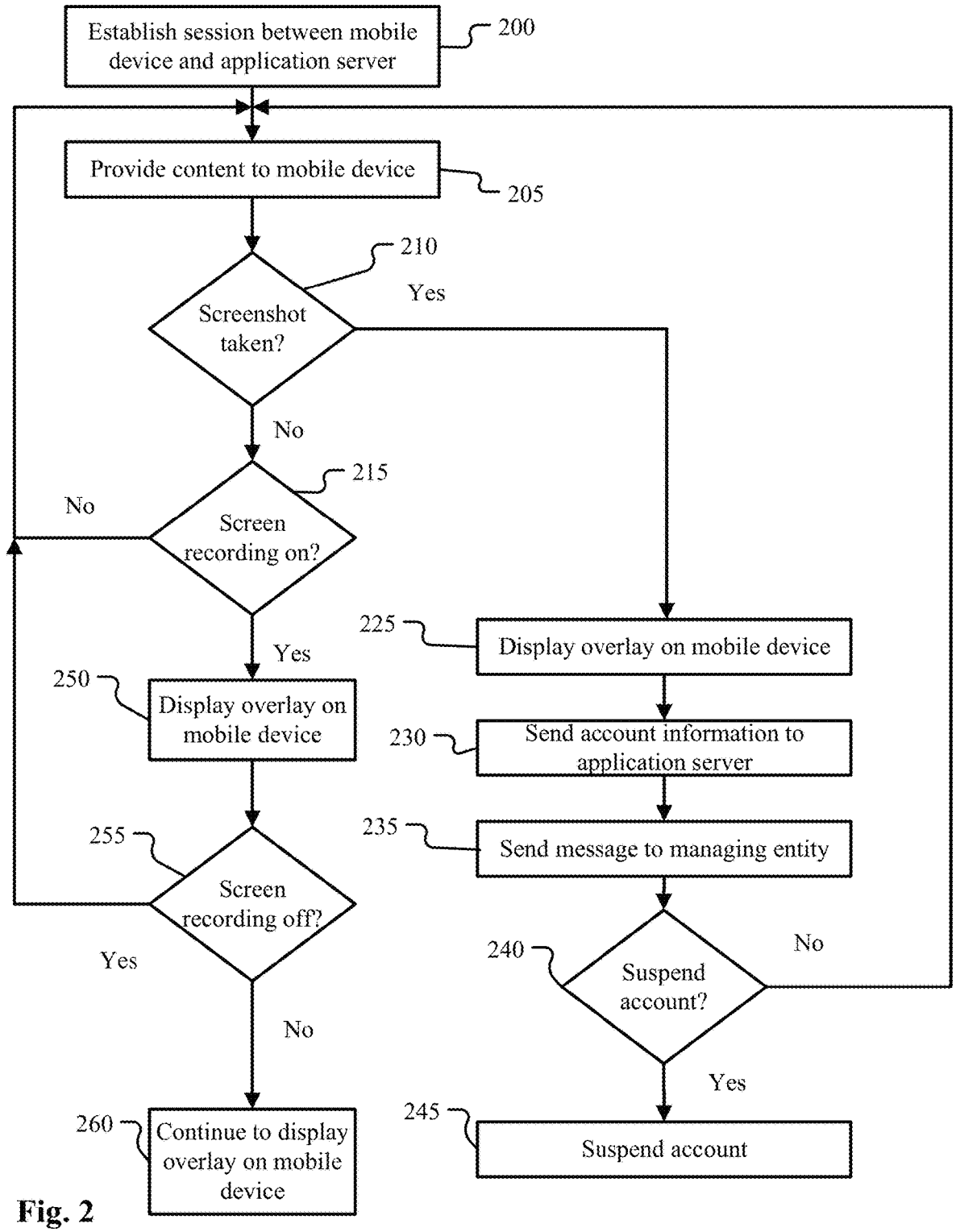
FIG. 2 illustrates a flow chart in accordance with at least one example embodiment.

FIG. 2 illustrates a flow chart in accordance with at least one example embodiment. The operations in FIG. 2 may be carried out by one or more elements of the system 100. Here, it should be understood that the operations of FIG. 2 may be implemented when the application 120 is being executed by a particular operating system (OS). For example, the operations of FIG. 2 may be useful for the application 120 running on a version of iOS.

In operation 200, the system 100 may establish a session between the mobile device 105 and the application server 110. For example, a user of the mobile device 105 may open the application 120. Upon opening, the application 120 may prompt the user to enter login information, such as a username and password to authenticate the mobile device 105 to the application server 110. Upon successful authentication, the session may be established.

In operation 205, the system 100 provides content to the mobile device 105. For example, the content may be provided in response to user input at the application 120 that requests content from the content source 115. The content may be video and/or audio content, for example, a livestream of an environment.

In operation 210, the system 100 detects whether the mobile device 105 has taken a screenshot within the application 120. For example, application 120 uses the iOS framework 'Foundation' to detect when a screenshot has been taken. The application 120 may create a listener function using the 'NSNotificationCenter' class that subscribes to the 'UIApplicationUserDidTakeScreenshotNotification' notification. When the notification is activated, the application 120 is aware that a screenshot has been taken. Additionally or alternatively, the application 120 may detect hardware button presses on the mobile device 105. This feature is possible because application developers are often given access to various lifecycle methods that indicate certain operating system-level functions have been called. Subscribing to these functions allows the application 120 to determine what hardware buttons were pressed. Hardware buttons that enable screenshots are often pre-selected by operating system developers so that detecting which buttons were pressed may allow the application 120 to determine that a screenshot was taken. If, in operation 210, a screenshot is detected, the method proceeds to operation 225. If not, then the method proceeds to operation 215. Other methods of detecting a screenshot are possible and are within the skill of one having ordinary skill in the art when viewed in light of the instant description.

In operation 225, the system 100 displays an overlay on the mobile device 105. For example, the application 120 may cause the mobile device 105 to display a full screen popup or overlay that prevents the user from viewing the content being captured and/or recorded on the mobile device 105. The popup may remain open and displayed until one or more conditions have been met. Such conditions may include the session expiring, the recording stopping, and/or the user closing the application 120. Other conditions are discussed in more detail with reference to FIG. 5.

In operation 230, the system 100 sends account information of the user attempting to take screen shots/recordings to the application server 110. For example, the application 120 causes the mobile device 105 to send a unique identifier associated with the account at the application 120 (e.g., a username associated with the account) to the application server 110. The application server 110 may identify the violating account using the unique identifier, and determine whether to suspend the account based on one or more factors. For example, the application server 110 may suspend the account if the screen shot/screen recordings attempts have occurred more than a threshold number of times (e.g., three times) within a threshold amount of time (e.g., one week). Both thresholds may be design parameters set based on empirical evidence and/or preference. If a user attempts to log into a suspended account, the application 120 does not allow the login to proceed. The application server 110 may also send a message (e.g., SMS message, email, etc.) to a user associated with the account informing the user that the account is suspended or at risk for being suspended as a result of multiple violations.

In operation 235, the system 100 sends a message to a managing entity that manages the application server 110, where the message includes the account information identified in operation 230. For example, the application server 110 may send an email to an email address of the managing entity with the account information (e.g., username) to notify the managing entity that a screenshot and/or screen recording has been attempted by the account. The managing entity may use this information as desired, for example, to establish patterns of attempted captures/recordings and use that information to make suspension decisions.

In operation 240, the system 100 determines whether to suspend the account associated with taking the screenshot. For example, as noted above, the application server 110 may suspend the account based on one or more factors. By way of example, the application server 110 may suspend the account when the user of the mobile device 105 has attempted to take a threshold number of screenshots (e.g., four). In another example, the application server 110 may suspend the account when the number of screenshots taken exceeds the threshold number within a threshold amount of time (e.g., one week). The threshold number of screenshots and the threshold amount of time may be fixed or variable design parameters set based on empirical evidence and/or preference. The thresholds may be different for different accounts. For example, the threshold number of screenshots and/or the threshold amount of time may be gradually lowered for repeat screenshot offenders to discourage continued violations. In another example, the thresholds may gradually increase for account owners that do not attempt to take a screenshot over a certain amount of time so as to reward good behavior.

If the application server 110 determines to suspend the account, then the method proceeds to operation 245. If not, the method returns to operation 205. If the application server 110 determines not to suspend the account, the application server 110 may additionally provide a warning message to the application 120 informing the user of the mobile device 105 that the account is at risk of being suspended. If desired, the warning message may include specific information about the conditions under which the account will be suspended. Thus, the warning message may include information about the thresholds mentioned above (e.g., information about when the threshold number of screenshots will be exceeded).

In operation 245, the application server 110 suspends the account. In at least one example embodiment, the application server 110 may temporarily suspend the account (e.g., for one day) before re-allowing (e.g., automatically re-allowing) access to the application 120. In at least one other example embodiment, the application server 110 may permanently suspend the account until that account owner contacts the managing entity to resolve the suspension. The application server 110 may send a message to the account owner informing them of the suspension and its severity (e.g., for one day, one week, etc.). The message may further include information on how to resolve the suspension, for example, by contacting the managing entity, waiting for a temporary suspension period to end, and/or the like.

As noted above, if, in operation 210, a screenshot has not been detected, the method proceeds to operation 215.

In operation 215, the system 100 detects whether the mobile device 105 has activated screen recording while the application 120 is open on the mobile device 105. In the example of the application 120 running on an iOS device, the application 120 uses the iOS framework 'Foundation' to detect when a screen recording has begun. The application 120 subscribes to the 'ObserveCapturedDidChange' notification provided by the 'UIKit' framework. When the ObserveCapturedDidChange notification is triggered, the application 120 checks the value of the UIScreenMainScreenCaptured property. If this property is set to 'true', the application 120 detects a screen recording. This event, however, occurs when the application is open. To protect against recordings that are started before the app is opened, the application 120 may use the 'OnActivated' lifecycle method, found in the 'AppDelegate' class, to check if the UIScreenMainScreenCaptured value is set to 'true'. The OnActivated method is activated when the user launches the application 120, or when the application 120 returns from the foreground. If the UIScreenMainScreenCaptured property is set to 'true', a screen recording is detected. Additionally or alternatively, the application 120 may subscribe to 'KeyPath' changes. Developers can add an observer for the 'captured' KeyPath. A change in the KeyPath value indicates that a screen recording has begun. If, in operation 215, a screen recording is detected, the method proceeds to operation 250. If not, the method returns to operation 205.

In operation 250, the application 120 causes the mobile device 105 to display an overlay on the mobile device 105. The overlay may be a proprietary still image that informs the user of an unauthorized screen recording and notify the user that the function must be turned off to resume receiving content. The overlay may prevent the user of the mobile device 105 from providing further user input to the mobile device 105 until the screen recording function is turned off.

In operation 255, the application 120 determines whether the screen recording is turned off. If so, the method returns to operation 205 to continue providing content to the mobile device 105. If not, in operation 260, the application 120 causes the mobile device 105 to continue displaying the overlay on the mobile device 105. The screen recording may be detected as being turned off in the opposite manner as that described above for detecting that the screen recording is active (e.g., by checking if the above mentioned values are set to 'false').

Here, it should be appreciated that in the example method of FIG. 2, detection of a screen recording is not reported to the application server 110 and/or the managing entity of the application server 110. However, in at least one other example embodiment, the detection of a screen recording is reported to the application server 110 and/or the managing entity in the same manner as that described above for detection of screenshots. For example, if desired, operations 230, 235, 240, and/or 245 may be additionally carried out upon detection of a screen recording.

Figure 3:
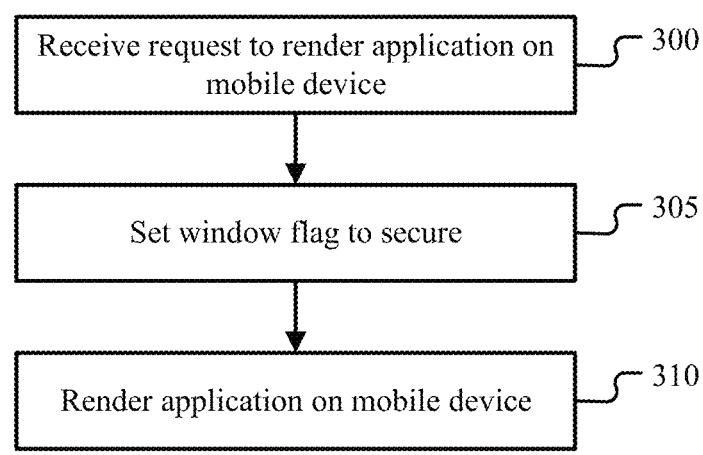
FIG. 3 illustrates a flow chart in accordance with at least one example embodiment.

FIG. 3 illustrates a flow chart in accordance with at least one example embodiment. The operations in FIG. 3 may be carried out by one or more elements of the system 100. Here, it should be understood that the operations of FIG. 3 may be implemented when the application 120 is being executed by a particular operating system (OS). For example, the operations of FIG. 3 may be useful for the application 120 running on a version of Android.

In operation 300, the system 100 receives a request to render the application 120 on the mobile device 105. For example, a user of the mobile device 105 opens the application 120 on the mobile device 105 and enters authentication information (e.g., a username and password). The application server 110 treats the receipt of the authentication information as the request to render the application 120 on the mobile device 105.

In operation 305, the system 100 sets a window flag to secure. For example, the application 120 uses the 'WindowManager' class, provided by the 'android.view' framework, to set the 'Secure' flag before the application is rendered to the end user. This flag treats the content of the window as secure, and effectively prevents the content from appearing in screenshots or recordings. For example, if a user attempts a screenshot or recording, the screenshots or recordings return a blank screen on the mobile device 105.

Here, it should be understood that FIG. 3 relates to preventing screenshots and screen recordings without the need to detect such actions first. However, additionally or alternatively, screenshots may be detected, for example, by programming the application 120 to listen for the ACTION MEDIA SCANNER SCAN FILE broadcast action using a 'Broadcaster Receiver' class. Whenever this broadcast is detected, the application 120 causes an overlay to be displayed on the mobile device 105 similar to the popup described above.

It should be appreciated that FIG. 3 describes alternative operations for detecting and/or preventing screen shot and screen recording compared to FIG. 2, and that the operations described in FIG. 2 may also be carried out for the system 100 executing the operations in FIG. 3.

Figure 4:
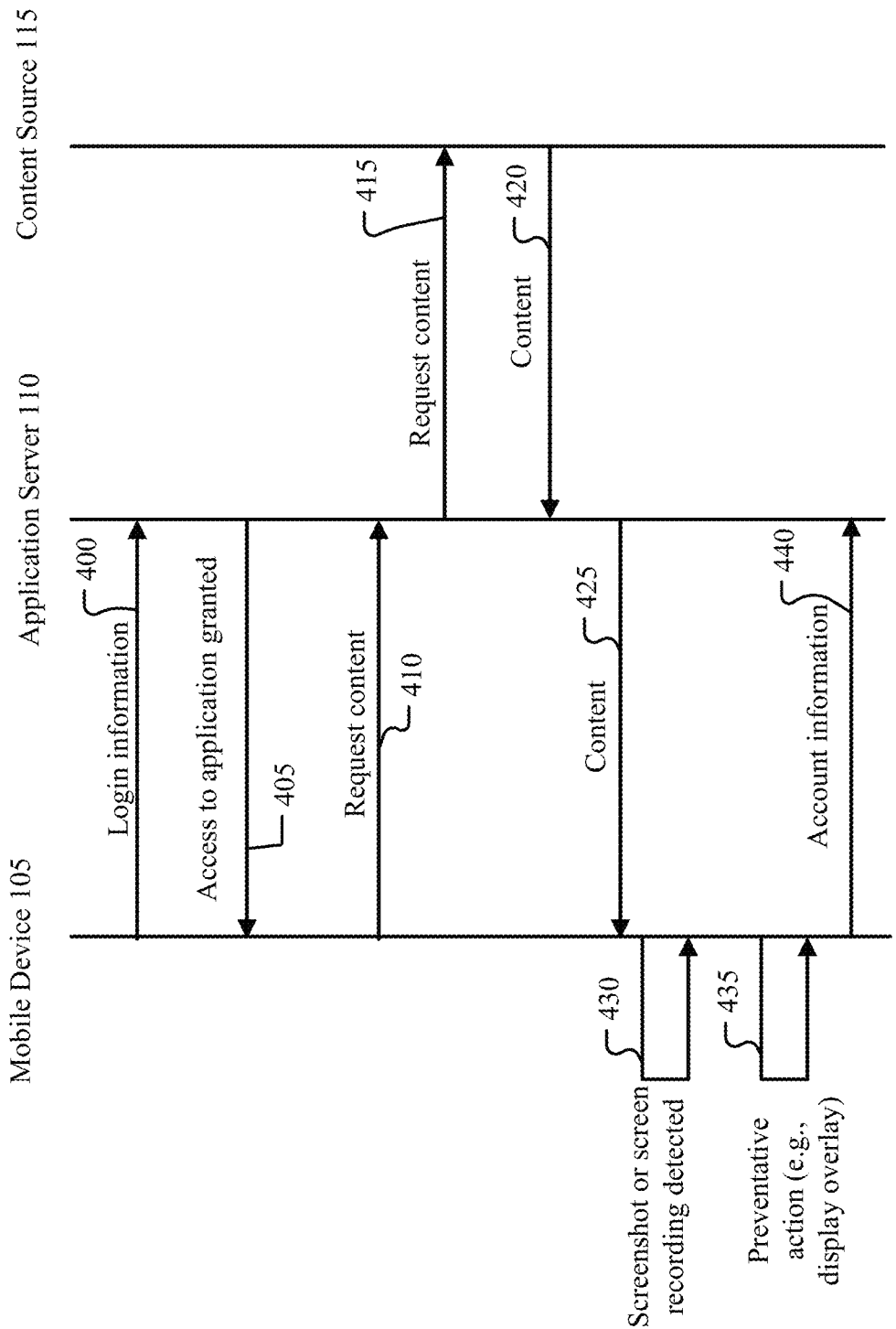
FIG. 4 illustrates a messaging diagram in accordance with at least one example embodiment.

FIG. 4 illustrates a messaging diagram in accordance with at least one example embodiment.

In more detail, FIG. 4 illustrates an example series of operations showing messages exchanged between the mobile device 105, the application server 110, and the content source 115. In operation 400, the mobile device 105 sends a message to the application server 110 including login information for the application 120. The login information may comprise a username and password or other unique identifier(s) to authenticate the mobile device 105 to the application server 110. If the login information is authenticated by the application server 110, the application server 110, in operation 405, sends a message granting a user of the mobile device 105 access to the application 120.

In operation 410, the mobile device 105 sends a message to the application server 110 requesting content from the content source 115. The content may include a live stream of audio and/or video and/or still images. If the account associated with application 120 on the mobile device 105 has the proper permissions pertaining to the request for content, then the application server 110, in operation 415, sends a message to the content source 115 to request the content.

In operation 420, the content source 115 sends the content 420 to the application server 110, where, in operation 425, the application server 110 sends the content to the mobile device 105. In operation 430, the application 120 on the mobile device 105 detects a screenshot or screen recording. In operation 435, the application 120 takes preventative action. For example, the application 120 causes the mobile device 105 to display a static, predetermined overlay informing the user of an improper attempt to screenshot or screen record. In operation 440, the mobile device 105 sends a message to the application server 110 containing account information (e.g., the login information from operation 400) associated with the application 120. Operation 440 may also include sending an email to a managing entity of the application server 110 and/or a message to the user in accordance with the operations discussed with reference to FIG. 2.

Here, it should be appreciated that FIGS. 2-4 are generally directed to detecting screenshots and screen recordings. However, example embodiments may also detect screen mirroring, casting, and/or the like, and carry out the same or similar operations as in FIGS. 2-4. Detection of screen mirroring, casting, and similar methods of reproducing content are within the skillset of one having ordinary skill in the art.

Figure 5:
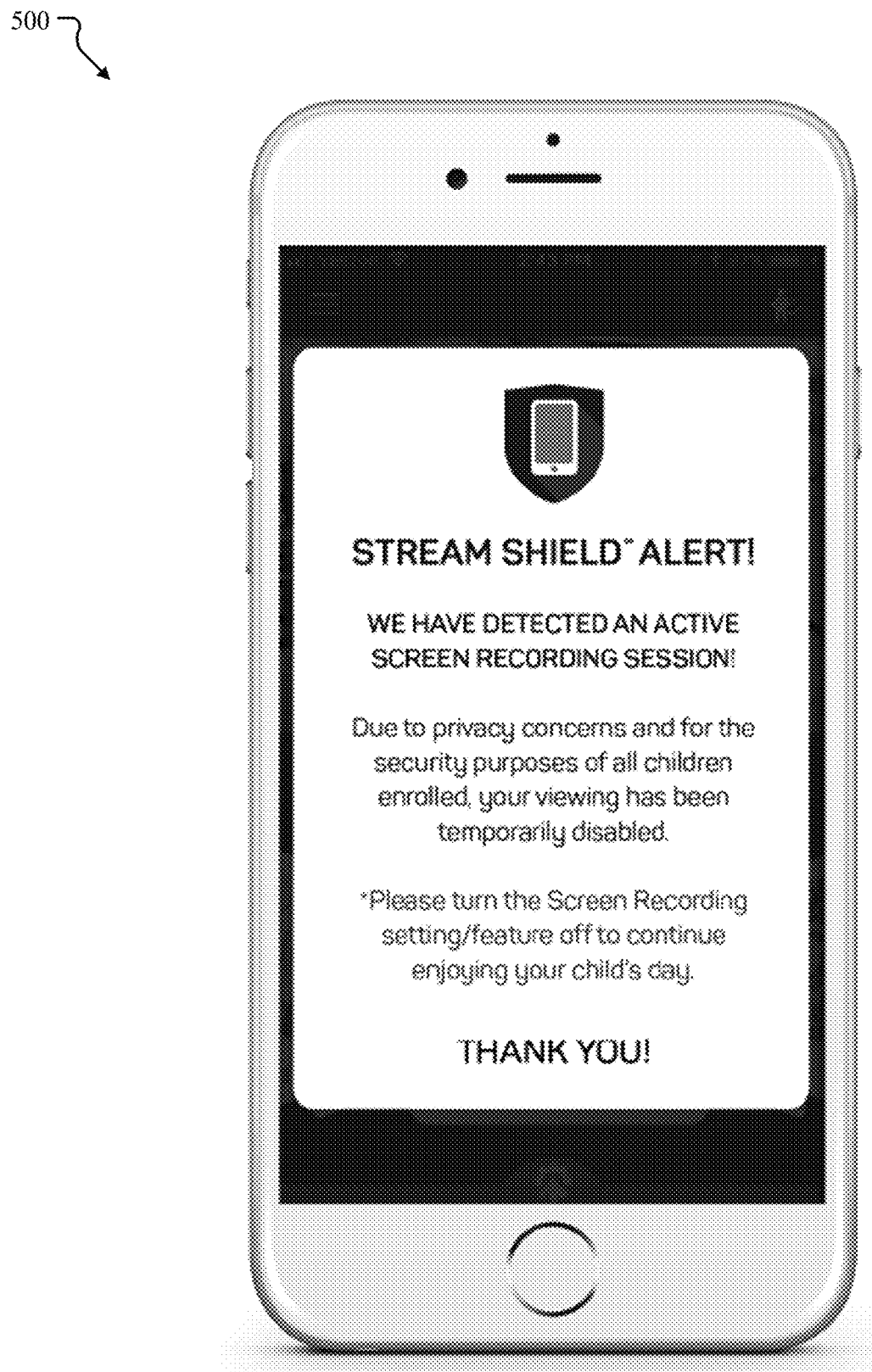
FIG. 5 illustrates an example obstruction for blocking content in accordance with at least one example embodiment.

FIG. 5 illustrates an example obstruction 500 for blocking content in accordance with at least one example embodiment. Upon detection of screenshots and screen recordings, the mobile device 105 may display the obstruction 500 to block the content from being viewed by a user. The obstruction 500 may include an indication of one or more conditions that must be met before the mobile device 105 removes the obstruction 500. In the example of FIG. 5, a screen recording has been detected, and the indication of the one or more conditions is that the user of the mobile device 105 should turn off the screen recording function. However, example embodiments are not limited thereto, and the obstruction 500 may include indications of other conditions or information, such as a notice that the account is suspended, an instruction to contact a managing entity of the application server 110 to unsuspend the account, contact information (e.g., phone number, email address, etc.) of the managing entity, and/or the like. The obstruction 500 may further include a warning to the user that the account is at risk of being suspended. The warning may include information to make the user aware of the thresholds discussed above with reference to FIG. 2, and/or make the user aware of how many more recording violations are possible before the account will be suspended.

The indication of the one or more conditions to be met may be pre-programmed into the application 120. Additionally or alternatively, the indication may be received from the application server 110, for example, in response to the application server 110 being notified that an attempt has been made to record content. Thus, the indication of the one or more conditions may be adjusted by the managing entity of the application server 110 and tailored to the specific account associated with the recording violation.

The obstruction 500 in FIG. 5 is an example of a proprietary overlay that includes information programmed into the application 120. Such information includes a name of the application or product (e.g., Stream Shield). However, the obstruction 500 may also be substantially blank with or without the indication of the one or more conditions.

Figure 6:
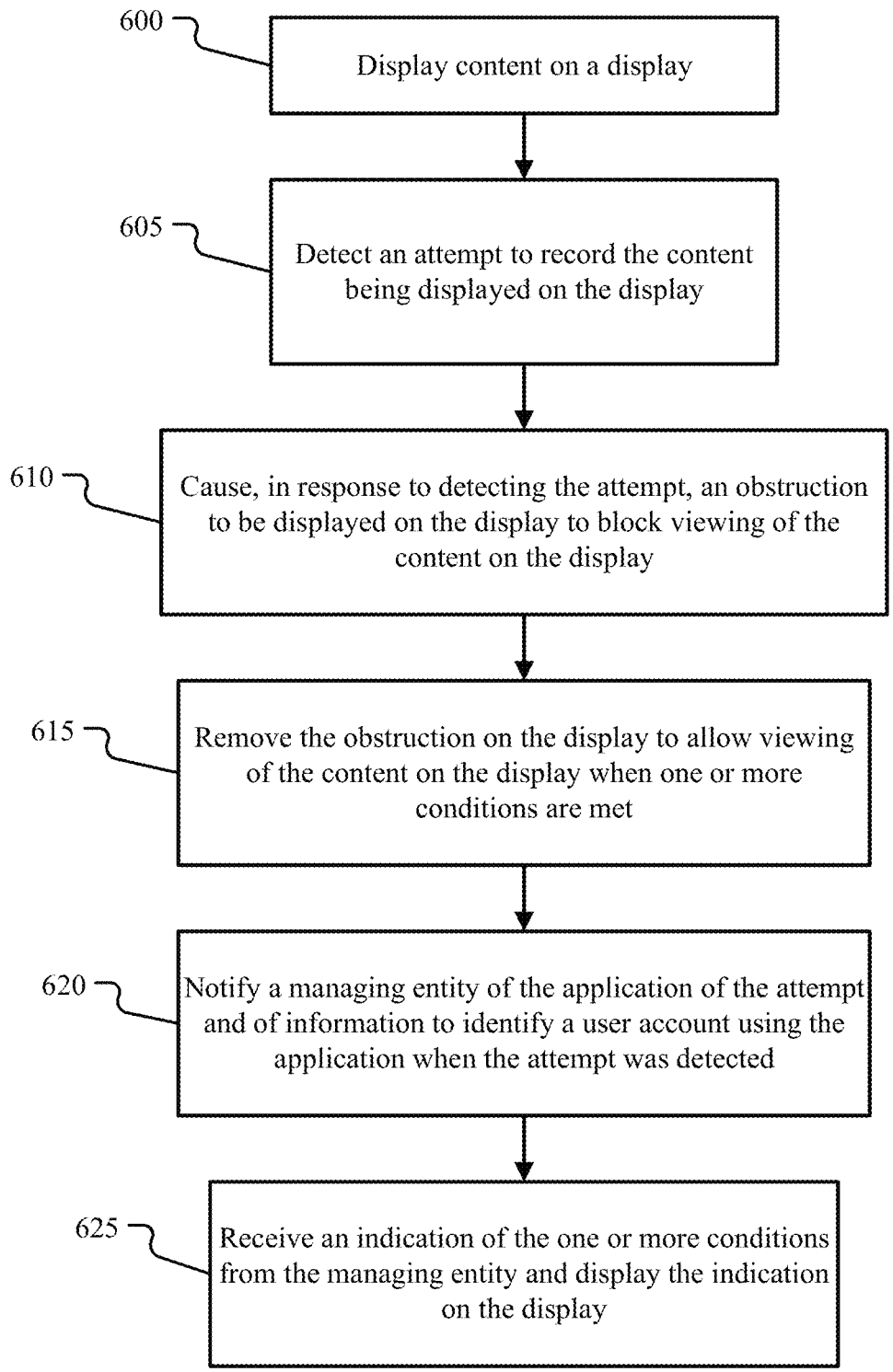
FIG. 6 illustrates a flow cart in accordance with at least one example embodiment.

FIG. 6 illustrates a flow chart in accordance with at least one example embodiment. The operations in FIG. 6 may be carried out by one or more of the elements in the system 100, for example, by the mobile device 105 executing instructions, for example, downloaded from the application server 110.

In operation 600, the mobile device 105 displays content on the display, for example, through the application 120.

In operation 605, the mobile device 105 detects an attempt to record the content being displayed on the display. As noted above, the attempt to record the content may be a screen recording of the display, a screenshot of the display, or an attempt to mirror or cast content from the display.

In operation 610, the mobile device 105 causes, in response to detecting the attempt, an obstruction 500 to be displayed on the display to block viewing of the content on the display. As noted with reference to FIG. 5, the obstruction 500 may include a proprietary overlay on the display that obscures the content, or a blank overlay on the display that obscures the content. The obstruction 500 may include an indication of the one or more conditions, as discussed with reference to FIG. 5.

In operation 615, the mobile device 105 removes the obstruction 500 on the display to allow viewing of the content on the display when one or more conditions are met.

In operation 620, the mobile device 105, in response to detecting the attempt, notifies a managing entity of the application of the attempt and information to identify a user account using the application 120 when the attempt was detected.

In operation 625, the mobile device 105, receives an indication of the one or more conditions from the managing entity and displays the indication on the display.

With reference to FIGS. 1-6, it should be appreciated that the content may be automatically paused and/or automatically stored temporarily in memory from a time when viewing of the content is blocked by the obstruction 500 to a time when the obstruction 500 is removed. This allows display of the content to resume at or near the time point where the content was blocked to avoid gaps in providing the content to the user.

In view of the above, it should be appreciated that example embodiments provide methods for detecting and preventing screen capture and screen recordings of content. In a childcare or other care setting, such prevention increases privacy by inhibiting a user's ability to gather video or still images of others that appear in the content stream. However, example embodiments are not limited to the above use, and one of ordinary skill in the art may appreciate other uses that are within the scope of inventive concepts (e.g., prevention and/or notice of copyright violations on content).

The various embodiments and variations thereof illustrated in the accompanying Figures and/or in the totality of this document are merely exemplary and are not meant to limit the scope of inventive concepts.

At least one example embodiment is directed to a non-transitory computer readable medium including instructions that when executed by a processor, cause the processor to detect an attempt to record content being displayed on a display, cause, in response to detecting the attempt, an obstruction to be displayed on the display to block viewing of the content on the display, and remove the obstruction on the display to allow viewing of the content on the display when one or more conditions are met.

In at least one example embodiment, the attempt to record the content is a screen recording of the display.

In at least one example embodiment, the one or more conditions includes detecting that the screen recording ceases.

In at least one example embodiment, the obstruction includes a proprietary overlay on the display that obscures the content.

In at least one example embodiment, the obstruction includes an indication of the one or more conditions.

In at least one example embodiment, the obstruction is a blank overlay on the display that obscures the content.

In at least one example embodiment, the attempt to record the content is a screenshot of the display.

In at least one example embodiment, the content is displayed on the display through an application, and wherein a managing entity of the application is notified of the attempt and sends information to identify a user account using the application when the attempt is detected.

In at least one example embodiment, subsequent to notifying the managing entity of the attempt, an indication of the one or more conditions is sent from the managing entity for display on the display. The indication is generated by the managing entity specifically for the user account.

In at least one example embodiment, the one or more conditions includes the managing entity unsuspending the user account.

At least one example embodiment is directed to a method that includes displaying content on a display, detecting an attempt to record the content being displayed on the display, causing, in response to detecting the attempt, an obstruction to be displayed on the display to block viewing of the content on the display, and removing the obstruction on the display to allow viewing of the content on the display when one or more conditions are met.

In at least one example embodiment, the attempt to record the content is a screen recording of the display.

In at least one example embodiment, the one or more conditions includes detecting that the screen recording ceases.

In at least one example embodiment, the obstruction includes a proprietary overlay on the display that obscures the content, and wherein the proprietary overlay includes an indication of the one or more conditions.

At least one example embodiment is directed to a device including a display that displays content, a memory including instructions, and a processor that executes the instructions to detect an attempt to record the content being displayed on the display, cause, in response to detecting the attempt, an obstruction to be displayed on the display to block viewing of the content on the display, and remove the obstruction on the display to allow viewing of the content on the display when one or more conditions are met.

In at least one example embodiment, the attempt to record the content is a screen recording of the display.

In at least one example embodiment, the one or more conditions includes detecting that the screen recording ceases.

In at least one example embodiment, the obstruction includes a proprietary overlay on the display that obscures the content, and wherein the proprietary includes an indication of the one or more conditions.

At least one example embodiment is directed to a system including a mobile device including an application stored thereon for providing content on a display of the mobile device, an application server in communication with the application through the mobile device, and a content source that provides the content to the application. The mobile device is configured to detect an attempt to record the content being displayed on the display, cause, in response to detecting the attempt, an obstruction to be displayed on the display to block viewing of the content on the display, and remove the obstruction on the display to allow viewing of the content on the display when one or more conditions are met.

In at least one example embodiment, the attempt is at least one of a screenshot or a screen recording of the display by the mobile device.

In at least one example embodiment, when the attempt is detected, the mobile device sends account information associated with an account using the application to the application server.

In at least one example embodiment, the application server suspends the account if the attempt causes a number of detections of attempts associated with the account to exceed a threshold number within a threshold amount of time.

In at least one example embodiment, the one or more conditions includes a managing entity of the application server unsuspending the account.

In at least one example embodiment, when the one or more conditions are met, the application server sends a warning message to the mobile device indicating that the account is at risk of suspension It is to be appreciated that numerous variations of the technology disclosed herein have been contemplated as would be obvious to one of ordinary skill in the art with the benefit of this disclosure. Additionally, while certain features may be categorized under one or more headings, it is to be appreciated that the feature(s) described under a particular heading may be used in association with other portions of the specification and/or feature(s) described herein.

While the above described methodology has been discussed in relation to a particular sequence of events, it should be appreciated that minor changes to this sequence can occur without materially effecting the operation of the technology.

The above-described system and methodology, as has been indicated herein, can be implemented on a computing device(s), such as a personal computer, server, dedicated computing device, distributed processing system, or the like, or a separately programmed general purpose computer. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as a discrete element circuit, a programmable logic device such as a PLD, PLA, FPGA, PAL, or the like, in fuzzy logic, artificial intelligence and/or neural networks. In general, any device(s) or module capable of implementing a state machine that is in turn capable of implementing the processes described herein can be used to implement the disclosed technology.

Furthermore, the disclosed methods may readily implemented in software stored on a non-transitory computer-readable information storage media (or medium) using, for example, object or object-oriented software development environments that provide portable source code that can be used on a variety of computer or workstation platforms. The disclosed system and methodology may also be implemented partially or fully in hardware using standard logic circuits or, for example, a VLSI design. Whether software or hardware is used to implement the systems in accordance with this invention is dependent on the speed and/or efficiency requirements of the system, the particular function, and the particular software or hardware systems or microprocessor or microcomputer systems being utilized.

The systems and methods illustrated herein can be readily implemented in hardware and/or software using any suitable systems, means, structures, devices and/or the functionality stored on an appropriate information storage medium, by those of ordinary skill in the applicable art from the functional description provided herein and with a basic general knowledge of the computer and software arts.

Furthermore, it should be appreciated that various types of links can be used to interconnect function elements, modules (i.e., hardware, software or any combination thereof) and/or means that perform portions of the functionality described herein. These links can be wired or wireless links, or a combination thereof, or any known or later developed element(s) that is capable of supplying and/or communicating data to and from the connected elements.

While the embodiments illustrated allow the various components to be collocated, it is to be appreciated that various components of the system can be located at distant portions of a distributed network, such as a communications network and/or the Internet and/or within a dedicated communications network. Thus, it should be appreciated that the various components can be combined into one or more devices or collocated on a particular node of a distributed network, such as a telecommunications network. As will be appreciated from the description, and for reasons of computational efficiency, the components can be arranged at any location within a distributed network without affecting the operation of the system.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

While the disclosed technology has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

It is claimed:

1. A non-transitory computer readable medium including instructions that when executed by a processor, cause the processor to:
   receive an indication of user input to open an application that renders content for display on a display;
   set a flag of a window manager of the application to secure before the application renders the content to the display to prevent an attempt to record the content on the display without first detecting the attempt to record the content; and
   in the absence of setting the flag to secure, the instructions cause the processor to:
      detect the attempt to record the content being displayed on the display;
      cause, in response to detecting the attempt, an obstruction to be displayed on the display to block viewing of the content on the display; and
      remove the obstruction on the display to allow viewing of the content on the display when one or more conditions are met.

2. The non-transitory computer readable medium of claim 1, wherein the content comprises a live-stream of an environment, wherein the attempt to record the content is a screen recording of the display.

3. The non-transitory computer readable medium of claim 2, wherein the one or more conditions includes detecting that the screen recording ceases.

4. The non-transitory computer readable medium of claim 1, wherein setting the flag to secure prevents recording of the content by producing a blank screen when the recorded content is viewed, wherein the obstruction includes a proprietary overlay on the display that obscures the content.

5. The non-transitory computer readable medium of claim 1, wherein the obstruction includes an indication of the one or more conditions.

6. The non-transitory computer readable medium of claim 1, wherein the obstruction is a blank overlay on the display that obscures the content.

7. The non-transitory computer readable medium of claim 1, wherein the attempt to record the content is a screenshot of the display.

8. The non-transitory computer readable medium of claim 1, wherein the instructions include instructions that cause the processor to notify a managing entity of the application of the attempt and sends information to identify a user account using the application when the attempt is detected.

9. The non-transitory computer readable medium of claim 8, wherein, subsequent to notifying the managing entity of the attempt, the instructions cause the processor to receive an indication of the one or more conditions is from the managing entity for display on the display, wherein the indication is generated by the managing entity specifically for the user account.

10. The non-transitory computer readable medium of claim 8, wherein the one or more conditions includes the managing entity unsuspending the user account.

11. A device, comprising:
   a display that displays content;
   a memory including instructions; and
   a processor that executes the instructions to:
      receive an indication of user input to open an application that renders the content on the display;
      detect an attempt to record the content being displayed on the display;
      cause, in response to detecting the attempt, an obstruction to be displayed on the display to block viewing of the content on the display;

remove the obstruction on the display to allow viewing of the content on the display when one or more conditions are met;

detect whether the attempt to record the content is a screen recording of the content or a screenshot of the content;

notify, when the attempt to record the content is the screenshot, a managing entity of the application of the screenshot and send information to the managing entity that identifies a user account using the application when the screenshot occurred; and do not notify, when the attempt to record the content is the screen recording, the managing entity of the application of the screen recording.

12. The device of claim 11, wherein the screenshot is detected when a first notification from a first listener function of the application is active, and wherein the screen recording is detected when a second notification from a second listener function of the application is active and when a value of a property checked when the second notification is determined to be active is set to 'true'.

13. The device of claim 11, wherein the one or more conditions includes detecting that the screen recording ceases.

14. The device of claim 11, wherein the obstruction includes a proprietary overlay on the display that obscures the content, and wherein the proprietary overlay includes an indication of the one or more conditions.

15. A system, comprising:
a mobile device including an application stored thereon for providing content on a display of the mobile device;
an application server in communication with the application through the mobile device; and
a content source that provides the content to the application, wherein the mobile device is configured to:
receive an indication of user input to open the application that renders the content for display on the display;
set a flag of the application to secure before the application renders the content to the display to prevent an attempt to record the content on the display without first detecting the attempt to record the content; and
in the absence of setting the flag to secure, the mobile device is configured to:
detect the attempt to record the content being displayed on the display;
cause, in response to detecting the attempt, an obstruction to be displayed on the display to block viewing of the content on the display;
remove the obstruction on the display to allow viewing of the content on the display when one or more conditions are met;
detect that the attempt to record the content is a screenshot when a first notification from a first listener function of the application is active;
detect that the attempt to record the content is a screen recording when a second notification from a second listener function of the application is active and when a value of a property checked when the second notification is determined to be active is set to 'true';
notify, when the attempt to record the content is the screenshot, a managing entity of the application of the screenshot and send information to the managing entity that identifies a user account using the application when the screenshot occurred; and
do not notify, when the attempt to record the content is the screen recording, the managing entity of the application of the screen recording.

16. The system of claim 15, wherein the content comprises a live-stream of an environment.

17. The system of claim 15, wherein the application server tailors the one or more conditions for removing the obstruction to the user account.

18. The system of claim 15, wherein the application server suspends the user account if the attempt causes a number of detections of attempts to record the content associated with the user account to exceed a threshold number within a threshold amount of time.

19. The system of claim 18, wherein the one or more conditions includes the managing entity of the application server unsuspending the user account.

20. The system of claim 15, wherein, when the one or more conditions are met, the application server sends a warning message to the mobile device indicating that the user account is at risk of suspension.

* * * * *